W. M. STONE.

BLANK HANDLING MECHANISM.

APPLICATION FILED AUG. 2, 1915.

Reissued Jan. 11, 1916.

14,047.

3 SHEETS—SHEET 1.

*Witnesses:*
M. E. Levy
Chas. W. La Rue

*Inventor:*
*Wilbur M. Stone*

*By* Kerr Page Cooper + Hayward
*his Attorneys.*

THE COLUMBIA PLANOGRAPH CO., WASHINGTON, D. C.

W. M. STONE.

BLANK HANDLING MECHANISM.

APPLICATION FILED AUG. 2, 1915.

Reissued Jan. 11, 1916.

14,047.

3 SHEETS—SHEET 2.

Witnesses:
M. E. Levy
Chas. W. La Rue

Inventor:
Wilbur M. Stone
By Kerr Page Cooper & Hayward
his Attorneys.

THE COLUMBIA PLANOGRAPH CO., WASHINGTON, D. C.

W. M. STONE.
BLANK HANDLING MECHANISM.
APPLICATION FILED AUG. 2, 1915.
Reissued Jan. 11, 1916.
14,047.
3 SHEETS—SHEET 3.
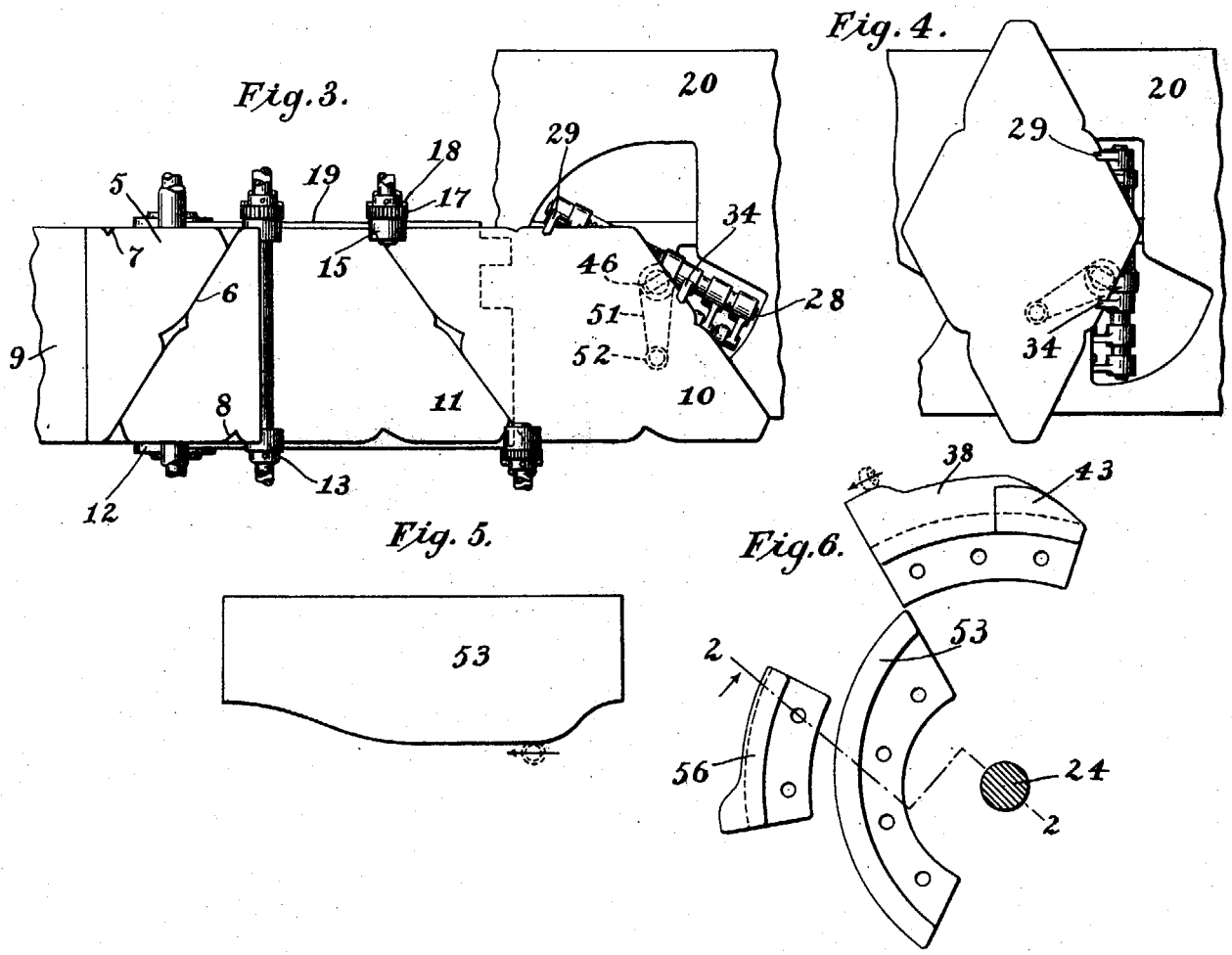
Witnesses:
M. E. Levy
Chas. W. LaRue
Inventor:
Wilbur M. Stone
By Kerr Page Cooper & Hayward
his Attorneys.
THE COLUMBIA PLANOGRAPH CO., WASHINGTON, D. C

UNITED STATES PATENT OFFICE.

WILBUR M. STONE, OF EAST ORANGE, NEW JERSEY, ASSIGNOR TO MERCANTILE CORPORATION, OF NEW YORK, N. Y., A CORPORATION OF NEW YORK.

BLANK-HANDLING MECHANISM.

14,047. Specification of Reissued Letters Patent. Reissued Jan. 11, 1916.

Original No. 1,123,617, dated January 5, 1915, Serial No. 755,348. Application for reissue filed August 2, 1915. Serial No. 43,352.

*To all whom it may concern:*

Be it known that I, WILBUR M. STONE, residing at East Orange, in the county of Essex and State of New Jersey, have invented certain new and useful Improvements in Blank-Handling Mechanism, of which the following is a full, clear, and exact description.

This invention relates to blank handling mechanism and particularly to means for turning sheet blanks from the position in which for instance, they are severed one after another from a continuous web, to a position more convenient for subsequent manipulation.

The object of my improvements is to provide mechanism of the class specified simple in construction and efficient in operation.

Figure 1:
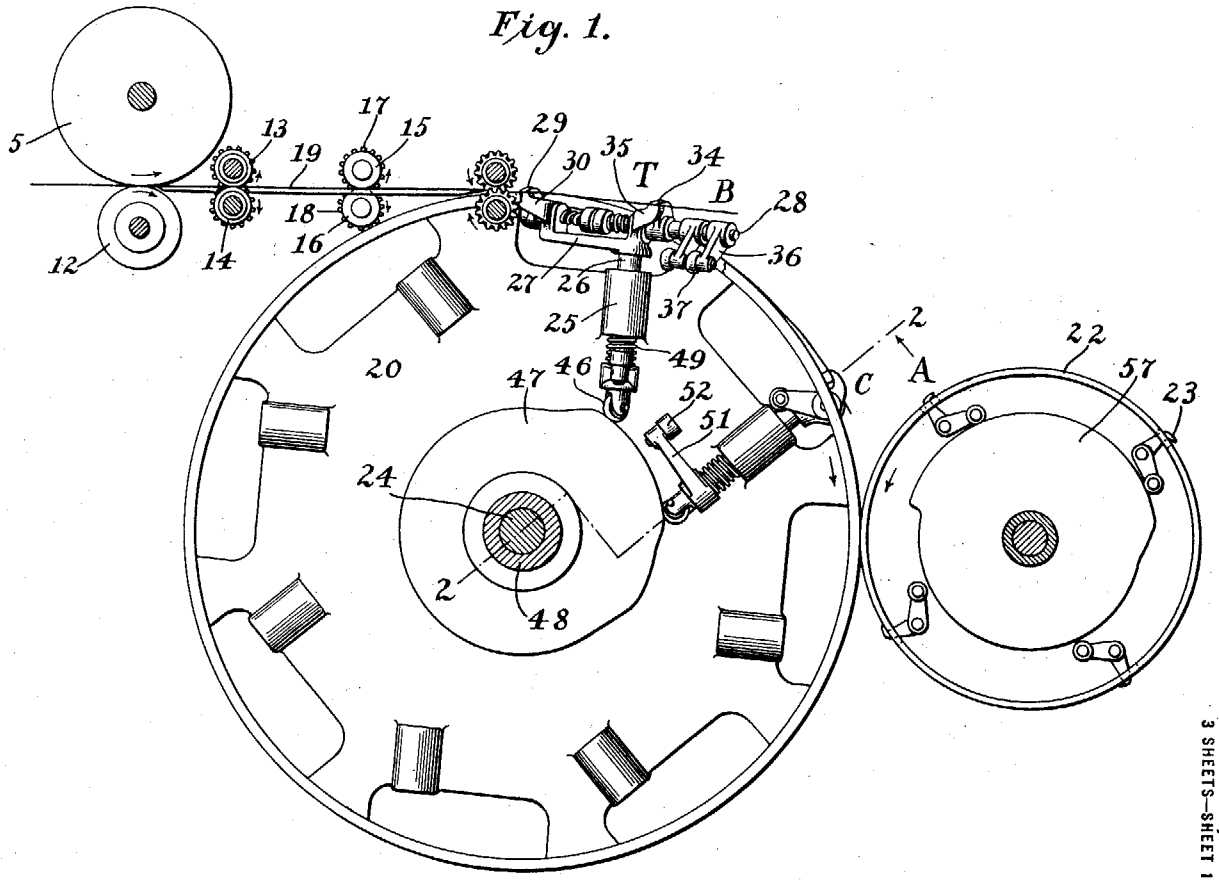
Figure 2:
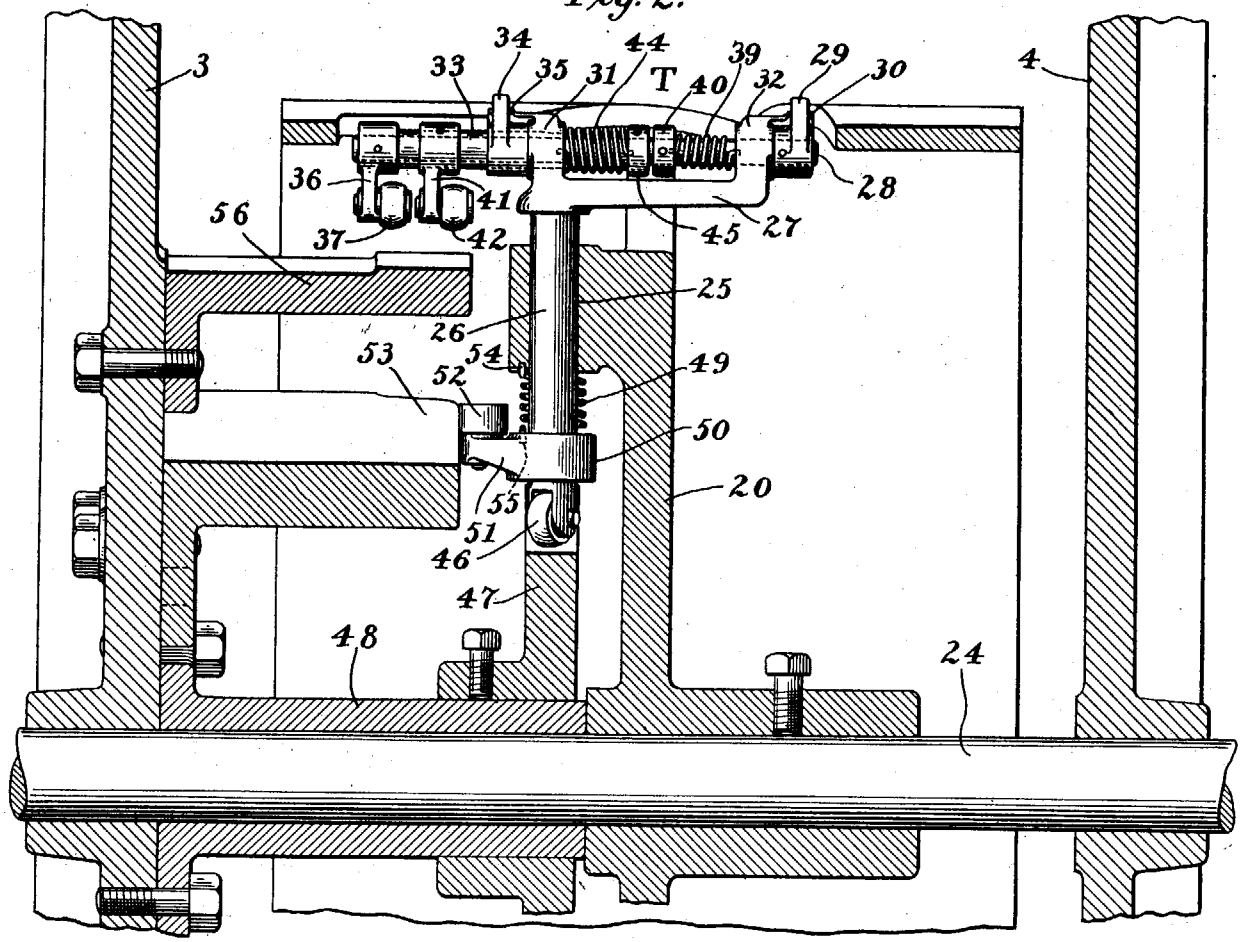

To these ends my improvements comprise means illustrated in their preferred form in the accompanying drawings wherein:

Figure 1 is a side elevation looking from the left of Fig. 2, with the left hand side frame and the cams fixed thereto removed. Fig. 2 is a sectional elevation, to an enlarged scale, on line 2, 2 of Fig. 1, looking in the direction of arrow A. Fig. 3 is a plan view of a portion of what is shown in Fig. 1. Fig. 4 is a plan view, similar to a portion of that of Fig. 3 but with the parts in different positions. Fig. 5 is a plan development of one of the cams and Fig. 6 is a side elevation showing arrangement of cams. All the figures except Fig. 2 are to one scale.

Before describing the invention in detail I desire to have it understood that the invention is not limited to the particular construction and arrangement of parts which I have illustrated and shall hereinafter describe, and that various changes may be made in the mechanism shown without departing from the spirit or scope of the invention, and that the phraseology which I employ is for the purpose of description and not of limitation.

My improvements are particularly adapted for use in connection with machines for making envelops from diamond shaped blanks cut diagonally from a continuous web. One of the major problems in such a machine is the turning of the blank from its primary relation to the web in which two of its opposite sides are in line with the edges of the web respectively, to an angular relation thereto, preferably to a position wherein two opposite edges of the presently to be folded envelop are parallel with such web edges or wherein the major axis of the blank is normal to its direction of travel.

My improved mechanism may be supported in the usual side frames, 3, 4. Rotary cutter 5 is provided with cutting edges as 6, 7, 8 whereby preferably at each rotation two envelop blanks as 10, 11 are severed successively from the leading end of web 9, by the coaction of said cutter 5 with rotary anvil 12. Said blanks during their severance from the web and thereafter are advanced synchronously with the surface speed of said cutter by means of upper and lower edge rolls as 13, 14 and 15, 16 respectively.

Said pairs of upper and lower rolls may be geared together by gears, as 17, 18 to rolls 15, 16 respectively. The usual table as 19 may be provided, over which to advance said blanks to turning cylinder 20. Said cylinder or rotary frame is preferably adapted to carry a plurality of blank turning devices, one of which is indicated in a general way by T. Said frame is fixed to shaft 24 which may be the main shaft of the machine. Said devices T are spaced equally about the periphery of said frame and said frame is rotated in clockwise direction, Fig. 1, at a peripheral speed equal to the speed of advancement of web 9.

Receiving cylinder 22 is rotatably mounted adjacent to frame 20 and their axes are parallel. Said receiving cylinder 22 is provided with the usual grippers as 23 actuated by fixed cam 57 for gripping to its periphery a blank delivered in turned position thereto by the devices T respectively of frame 20. Said cylinder 22 may be provided if desired with known folding means not shown for the envelop.

Cutter 5, anvil 12, edge feed rolls as 13, 14, 15, 16, frame 20 and cylinder 22, are all geared together by suitable spur gears on their respective axes, those gears being omitted from the drawings as unnecessary to illustrate this invention and as well understood in the art of such construction.

Directing attention now to the detail construction of my improved turning devices, a description of one will suffice for all. Rotatably mounted in bearing 25 of rotary frame 20 is stem 26 of turning head 27. The axis of said stem is preferably parallel to a line radial to axis 24 of frame 20. Rotatably mounted in bearings 31, 32 in said head and normal to stem 26, is clip shaft 28 and fixed to one end of said shaft is clip 29 for coaction with foot 30 outstanding from head 27, said clip and foot forming a gripper for engaging at one point, the envelop blanks to be turned. Fixed to sleeve 33 rotatably mounted on shaft 28 is clip 34 for coaction with foot 35 outstanding from head 27, said clip and foot forming another gripper for engaging said envelop blank at another point. Fixed to the end of shaft 28 opposite clip 29 is arm 36 carrying roll 37 for engagement with cam 38 for actuating said clip 29. Spring 39 has one end thereof fixed to bearing 32 and the other end fixed to collar 40 secured to shaft 28, for causing roll 37 to engage its cam and for causing clip 29 to coact with foot 30. Fixed to the outer end of sleeve 33 is arm 41 carrying roll 42 for engagement with cam 43 for actuating clip 34. Spring 44 has one end thereof fixed to bearing 31 and the other end fixed to collar 45 secured to the inner end of sleeve 33 for causing roll 42 to engage its cam and for causing clip 34 to coact with foot 35.

It will be observed, when an envelop blank as 10, Fig. 3, is advanced from the cutting device to be engaged and gripped by one of the turning devices T, that clip 34 must first come into action to grip the blank and that foot 35 thereunder should preferably lie coincident with the periphery of cylinder or frame 20 to be in suitable receiving position for the blank. It will also appear that after said clip has gripped the blank to foot 35, the turning device must be moved radially outwardly coincident with and proportionate to the advance movement in clockwise direction, Fig. 1, of frame 20 so as to present foot 30 in coincidence with the periphery of said frame at the time of the coaction of clip 29 therewith for gripping one of the sides of the blank which is parallel with the path of the blank. For causing said turning device to move thus outwardly I mount in the lower or inner end of stem 26, roll 46 for engagement with cam 47 fixed to the inner end of sleeve 48 bolted to side frame 3, concentric with shaft 24, Figs. 1 and 2. Said stem 26 is urged to its inner position and roll 46 is held to engagement with cam 47 by spring 49 interposed between the inner face of bearing 25 and collar 50 fixed therebelow to stem 26. In Figs. 1 and 3 device T is shown in its raised or outer position, in Fig. 1 clip 34 having previously operated to grip the blank at one point and clip 29 having just descended to grip said blank at another point. Device T now has said blank in full control and as soon as that blank is advanced a short distance farther from the bite of edge feed rolls as 15, 16 said device T turns in clockwise direction, from the position of Fig. 3 to the position of Fig. 4 and position C, Fig. 1, whereby the blank is located with its major axis in parallelism with the axis of shaft 24 of frame 20. However, the two points of gripping of said blank by device T are now, radially of frame 20, beyond the periphery of said frame, see position C, Fig. 1. Therefore cam 47 falls away directly after the point of contact of roll 46 therewith, position C, whereby said device T in the clockwise movement of frame 20, is presently lowered to cause the points of gripping of the blank to coincide with the periphery of said frame, for delivery to receiving cylinder 22.

For causing device T to turn axially with stem 26, as above described, I provide arm 51 outstanding from collar 50 on said stem. On the outer end of said arm 51 I provide roll 52 for engagement with cam 53 fixed to side frame 3. For urging said roll to engagement with said cam I employ said spring 49, securing the upper end 54 thereof in bearing 25 of frame 20 and the lower end 55 thereof in collar 50.

For lifting clips 29, 34 for permitting the delivery of the blank to grippers as 23 of cylinder 22 I employ cam 56 fixed to side frame 3. After delivering said blank to cylinder 22, turning device T continues onward with frame 20, and the several members of said device are returned to their initial positions ready to engage another blank.

I claim:

1. The combination of means for advancing an envelop blank whose sides form substantially a rhomb having sides parallel with the path of the blank, a turning device having means thereon for gripping the angularly disposed leading end of the blank and means for gripping one of the sides parallel with the path of the blank, and means for turning said device for presenting the blank in angular relation to its receiving position.

2. The combination of means for advancing an envelop blank whose sides form substantially a rhomb having sides parallel with the path of the blank, a turning device having means thereon for gripping the angularly disposed leading end of the blank and means for gripping one of the sides parallel with the path of the blank and means for turning said turning device for presenting the blank in angular relation to its received position and means for delivering said blank in its turned relation to subsequent mechanism.

3. The combination of means for advancing an envelop blank whose sides form substantially a rhomb having sides parallel with the path of the blank, a turning device having means thereon for gripping the angularly disposed leading end of the blank and means for gripping one of the sides parallel with the path of the blank, means for independently actuating each of said gripping means and means for turning said turning device for presenting the blank in angular relation to its received position.

4. The combination of means for advancing an envelop blank whose sides form substantially a rhomb having sides parallel with the path of the blank, a rotatable frame, a turning device pivotally mounted thereon having means for gripping the angularly disposed leading end of the blank and means for gripping one of the sides parallel with the path of the blank, means for independently actuating each of said gripping means for turning said turning device for presenting the blank in angular relation to its received position.

5. Blank handling mechanism including in combination, a pivotally mounted turning device, a pair of grippers thereon for gripping said blank, means for independently actuating each of said grippers, and means for swinging said turning device on its pivot for presenting said blank in angular relation to its received position.

6. In a machine for handling blanks each of which forms substantially a rhomb having its sides parallel with the path of the web from which it is cut, the combination of a turning device having means thereon for gripping the angularly disposed leading end of the blank and means for gripping one of the sides parallel with the path of the web and means for turning said turning device for presenting the blank in angular relation to its received position.

7. Blank handling mechanism including in combination, a rotatable frame, a turning device pivotally mounted thereon and mounted for movement axially of its pivot, a pair of grippers thereon for gripping said blank, means for independently actuating each of said grippers, and means for moving said device in the line of its pivotal axis outwardly and inwardly relatively to said rotatable frame.

8. Blank handling mechanism including in combination, a rotatable frame, a turning device pivotally mounted thereon and mounted for movement axially of its pivot, a pair of grippers thereon for gripping said blank, means for independently actuating each of said grippers, and means for swinging said turning device on its pivot for presenting said blank in angular relation to its received position.

9. Blank handling mechanism including in combination, a rotatable frame, a plurality of turning devices pivotally mounted symmetrically about the periphery of said frame, each device being mounted for movement axially of its pivot, a pair of grippers on each turning device for gripping said blank, means for independently actuating each of said grippers, and means for swinging each turning device on its pivot for presenting its blank in angular relation to its received position.

10. Blank handling mechanism including in combination, the following instrumentalities operated in the sequence recited; means for advancing a blank, a rotatable frame, a turning device pivotally mounted thereon and mounted for movement axially of its pivot, a gripper on said turning device operated for gripping the blank, means for moving said turning device in the line of its pivotal axis outwardly relatively to said rotatable frame, a second gripper on said turning device operated for gripping said blank, means for swinging said turning device on its pivot for presenting said blank in angular relation to its received position, means for moving said turning device in the line of its pivotal axis inwardly relatively to said rotatable frame, and means for releasing the grippers.

11. In a machine for handling blanks, each of which is a diamond shaped blank having its major axis at an angle to the side of the web from which they are cut, the combination of means for continuously advancing said blanks; and means for gripping said blanks and for turning and delivering the said blanks in a position with their major axes normal to their subsequent direction of travel.

12. In a machine for handling blanks each of which is a diamond shaped blank having its major axis at an angle to the side of the web from which they are cut, the combination of a blank handling device having means to grip the blank as it advances and to turn said blank to a position in which the major axis of the blank is normal to its subsequent direction of travel, said means comprising mechanism to continously advance the blank simultaneously with the turning thereof.

13. In a machine for handling a plurality of advancing blanks each of which is a diamond shaped blank having its major axis at an angle to the side of the web from which it is cut, the combination of blank receiving devices adapted to receive and advance the blanks; and means for continuously advancing the blanks to said blank receiving devices, said means including a blank turning device which grips the continuously advancing blanks and turns said blanks while gripped to position them with their major axes normal to their subsequent direction of travel in said blank receiving devices.

In testimony whereof I have hereunto set my hand, in the presence of two subscribing witnesses, this 26 day of July, 1915.

WILBUR M. STONE.

Witnesses:
VAN WILHITE,
FRANK ROGER.

Copies of this patent may be obtained for five cents each, by addressing the "Commissioner of Patents, Washington, D. C."